(12) United States Patent
Winn

(10) Patent No.: US 10,137,522 B2
(45) Date of Patent: Nov. 27, 2018

(54) ADAPTIVE PLASMA CUTTING SYSTEM AND METHOD

(71) Applicant: LINCOLN GLOBAL, INC., City of Industry, CA (US)

(72) Inventor: Jackie L Winn, Mount Pleasant, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 615 days.

(21) Appl. No.: 14/790,767

(22) Filed: Jul. 2, 2015

(65) Prior Publication Data

US 2017/0001255 A1   Jan. 5, 2017

(51) Int. Cl.
*B23K 10/00* (2006.01)
*H05H 1/34* (2006.01)

(52) U.S. Cl.
CPC ............ *B23K 10/006* (2013.01); *B23K 10/00* (2013.01); *H05H 1/34* (2013.01); *H05H 1/3405* (2013.01); *H05H 2001/3494* (2013.01)

(58) Field of Classification Search
CPC ........ B23K 10/006; B23K 10/00; H05H 1/34; H05H 1/3405; H05H 1/36; H05H 2001/3494

USPC ............ 219/121.55, 121.51, 121.44, 121.39, 219/121.54

See application file for complete search history.

(56) References Cited

U.S. PATENT DOCUMENTS

| | | | |
|---|---|---|---|
| 8,354,609 B2 | 1/2013 | Lindsay et al. | |
| 8,354,610 B2 | 1/2013 | Lindsay et al. | |
| 8,541,710 B2 | 9/2013 | Brandt et al. | |
| 8,809,728 B2 | 8/2014 | Brandt et al. | |
| 9,056,366 B2* | 6/2015 | Rappl | B23K 9/1006 |
| 2013/0263420 A1 | 10/2013 | Shipulski | |
| 2013/0264317 A1 | 10/2013 | Hoffa et al. | |
| 2013/0264320 A1 | 10/2013 | Shipulski et al. | |
| 2014/0061170 A1* | 3/2014 | Lindsay | B23K 26/60 219/121.54 |
| 2014/0113527 A1 | 4/2014 | Lindsay et al. | |
| 2015/0127137 A1* | 5/2015 | Brandt | B23K 5/00 700/166 |
| 2017/0129039 A1* | 5/2017 | Williams | B23K 10/006 |

\* cited by examiner

*Primary Examiner* — Mark Paschall
(74) *Attorney, Agent, or Firm* — Perkins Coie LLP

(57) ABSTRACT

A plasma torch system and method is provided, in which the system utilizes a number of pressure sensors throughout the system and the torch to detect the flow/pressure of shield and plasma gas during operation. The detected pressures are used by the system to dynamically control the system pressures to optimize the cutting operation.

21 Claims, 11 Drawing Sheets

ADAPTIVE PLASMA CUTTING SYSTEM AND METHOD

BACKGROUND OF THE INVENTION

Field of the Invention

Systems and methods of the present invention relate to plasma cutting, and more specifically to arc plasma cutting using an adaptive control system which detects and utilizes system pressures to optimize performance.

Description of the Related Art

The use of plasma cutting systems in various industries has grown, and as a result there is an increasing need to increase the durability and longevity of torches and their components. This is particularly true with regarding to some internal torch parts, such as the nozzle and electrode, and some external torch parts, such as the shield cap. As is generally known, plasma cutting involves the use of high current plasma jet which generates a large amount of heat during cutting and can generate spatter during piercing or arc starting. Additionally, plasma cutting utilizes gases for the cutting operation, such as shielding gases and plasma gases. These gases aid in stabilizing the plasma arc, shielding the arc and cooling components of the torch. As it is generally understood, for complex and precise cutting operations the flow and pressure of the gases should differ at different times during the cutting operation. Current plasma system are open loop control systems where a fixed pressure is set at a gas console (or the like) based on empirical data, where this fixed pressure may not take into account distances between the gas console and the torch or degradation of the torch components. These systems represent a compromise on gas flow control and do not optimize the cutting process. Further, such a system does not account for system to system variations, leaks, component wear, valving changes and anomalies, etc. Therefore, a more dynamic control scheme is desired to provide a more optimized cutting system and process.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Embodiments of the present invention include equipment and methods related to plasma cutting torches and systems which use dynamic pressure sensing to dynamically control the cutting process and system. This is done using pressure sensing devices, such as pressure transducers in various locations within the system and the torch, and information from these pressure sensors is used to dynamically control the cutting operation.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
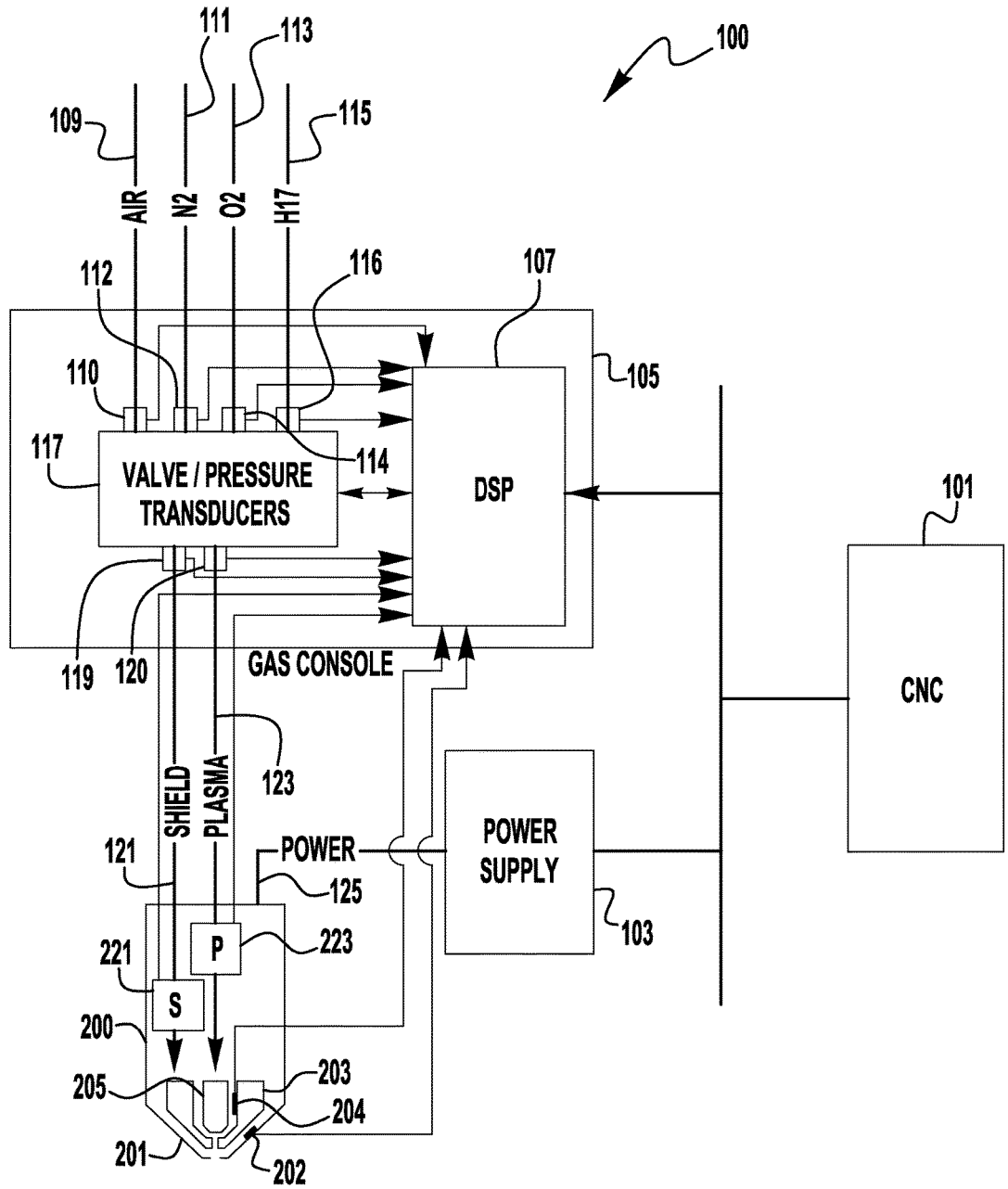
FIG. 1 is a diagrammatical representation of a an exemplary embodiment of a cutting system of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is noted that for purposes of the following discussion, the system will be discussed as a liquid cooled, mechanized plasma arc cutting system. However, exemplary embodiments are not limited to being used in such arc cutting systems, and embodiments can be used in hand held cutting systems as well as air cooled systems. Thus, the following discussions are intended to be exemplary and informative. Further, discussions below will use terminology such as "distal" and "downstream". In the context of this application it is understood that these terms mean closer to the end of the torch from which the plasma is emitted. For example, the distal end of the torch is the end of the torch from which the plasma jet is emitted to perform cutting. Further, is something is "downstream" of another component, it is closer to the distal end of the torch. Similarly, the use of the term "upstream" will generally indicate that something is further away from the distal end of the torch.

Because the manufacture, assembly and use of arc cutting torches is generally known to those of skill in the art, the details of their assembly and components thereof will not be set forth herein.

Turning now to FIG. 1, an exemplary dynamically controlled cutting system 100 is depicted. Consisted with many well-known cutting systems, the exemplary system 100 shown in FIG. 1 includes a computer numerical control (CNC) device 101 which can control the overall operation of the cutting process and system. The CNC 101 is configured, utilized and constructed in accordance with known automated systems and need not be described in detail herein. Further, the system 100 includes a power supply 103 which provides the cutting current to the torch 200 to generate the plasma arc for cutting. As generally known, the CNC 101 can control the power supply 103 to provide the desired output at the desired time in the cutting operation. Embodiments of the present invention are not limited by the design and construction of the power supply 103, which can be constructed consistent with known power supplies. Further, the system 100 includes a gas console 105 which can be generally constructed similar to known gas consoles, includes gas lines and valves to deliver the needed gasses to the cutting torch 200. In the shown embodiment, the console has 4 gas lines feeding into it from sources (not shown) such as tanks. As shown, there is an air line 109, a nitrogen line 111, an oxygen line 113 and a cutting gas line 115. These gases can be used to create the cutting plasma, and the air, nitrogen and oxygen can be used for shielding. These gases are used, and combined, to provide a shielding gas and a plasma gas to the torch. The mixture and use of these gases are generally known, and need not be discussed in detail herein. As shown, the has lines feed into a manifold 117 which can contain a plurality of valves (not shown) which control the flow of and mixture of the gases. Each of these valves can be electronically controlled valves such that they can be controlled via a controller, such as a digital signal processor DSP 107. The DSP receives control signals from the controller/CNC 101, and thus the flow of the respective gases can be controlled. In some exemplary embodiments, the controller/CNC 101 can be used to select the gas types needed and the flow control is controlled by the DSP. As shown, as an output of the manifold 117 there is a shield gas line 212 and a plasma gas line 123 which feeds each of these respective gas mixtures to the torch 200. Further, as shown in FIG. 1, in some exemplary embodiments, there are a plurality of pressure sensors (such as pressure transducers) positioned on and/or within the manifold 117 such that the respective pressures of each of the lines (incoming and outgoing) can be detected and signaled to the DSP 107, and ultimately to the controller 101.

For example, in some exemplary embodiments, the incoming gas lines 109, 111, 113 and 115, each have a pressure sensing device 110, 112, 114 and 116, respectively, which detects the pressure of the incoming gas to the console and/or manifold. This pressure data can be used by the CNC/controller 101 to ensure that an adequate incoming pressure is achieved. For example, a particular cutting operation may require a certain amount of pressure/flow from each of the respective gas sources, and the controller 101 uses the sensed pressure from each of these sensors to ensure that adequate pressure/flow from the gas sources is available.

Further, as shown, in exemplary embodiments of the present invention, each of the upstream ends of the shield and plasma gas lines (121 and 123, respectively) can have pressure sensors 119 and 120 to detect the beginning pressure in each of these lines. This pressure data is also sent via the DSP 107 to the controller 101, where the controller 101 can, again, use this detected pressure data to ensure that a proper flow of gas is being provided to the torch. That is, the controller 101 can use this pressure data to control each of the respective flow control valves (not shown) to ensure that the proper flow/pressure of gas is achieved for any given cutting operation. Thus, rather than using an open loop control methodology or a closed loop feedback limited to only feedback from the gas console, embodiments of the present invention can use a closed loop feedback control methodology, where the sensed pressure is used by the controller to ensure a desired amount of gas pressure and/or gas flow is being provided to the gas lines 121 and 123. The controller 101 would control the valves to achieve the desired gas flow for a given cutting operation and/or a given state in a cutting operation (e.g., purge, pierce, cutting, tail out, etc.).

As shown, each of the shield and plasma gases are directed to a cutting torch assembly 200. The torch assembly 200 can be constructed similar to known plasma cutting torches, including liquid cooled plasma cutting torches used, for example, in mechanized plasma cutting operations. Because the construction of such torches are generally known, a detailed discussion of their function and construction is not included herein. However, unlike known torches, torch assemblies of the present invention include pressure sensors which detect the pressures of the gases at different locations within the torch 200. These detected pressures are, again, used by the DSP and/or controller 101 to control the flow of gas to the torch 200.

Figure 7:
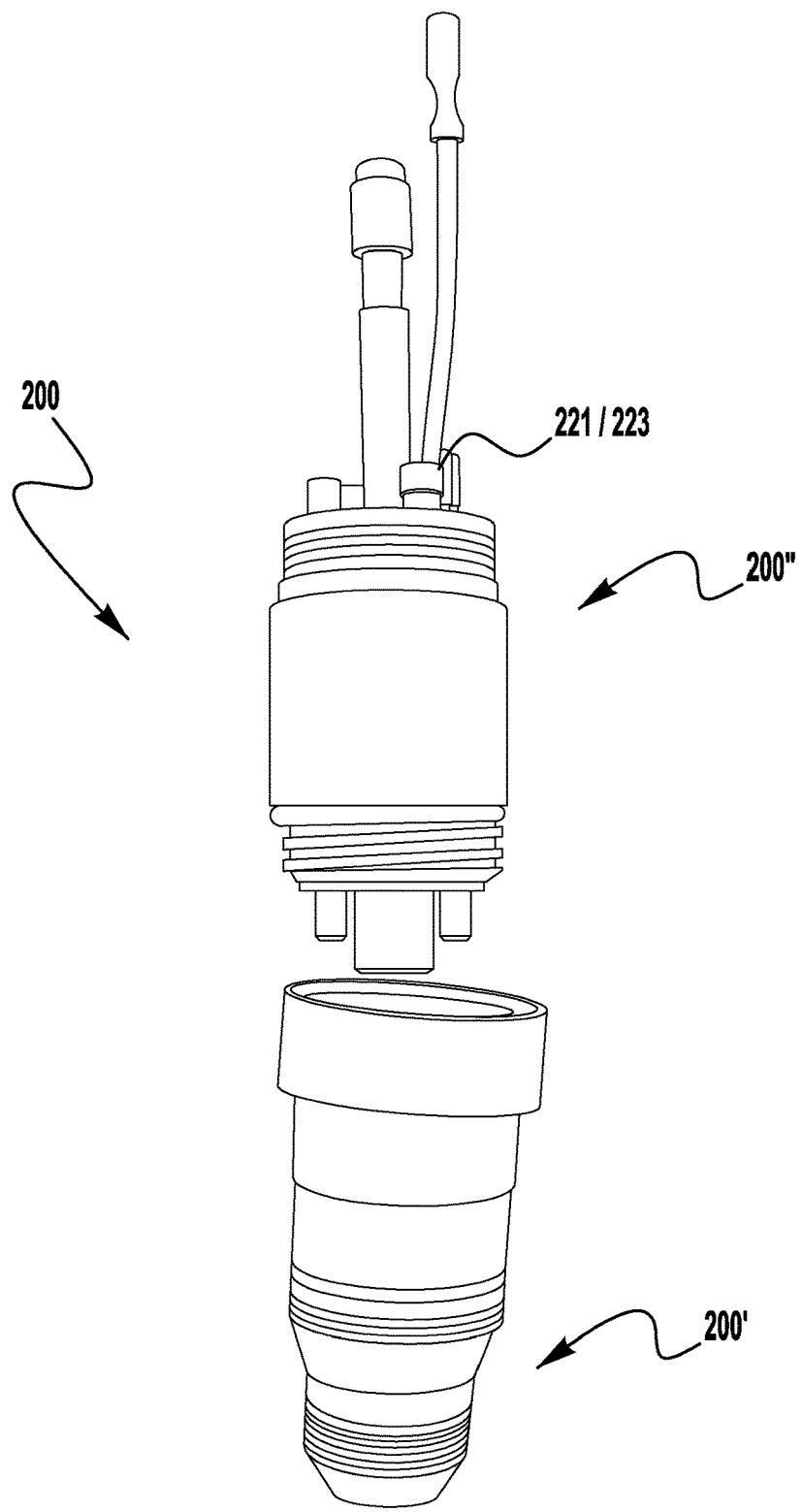
FIG. 7 is a diagrammatical representation of an exemplary torch assembly.

For example, as shown, in an exemplary embodiment of the present invention, pressure sensors 221 (shield gas) and 223 (plasma gas) can be used to detect the pressure of gas flowing into the torch assembly. For example, these sensors 221/223 can be located at the upstream end of the torch assembly 200 to detect the pressure of the gases as they enter the torch 200. The sensors can be located at the gas connections from the gas lines to the torch body assembly, or can be located between the torch body assembly and the torch head assembly. The pressure sensors should be of a type that can fit within the gas lines and/or connections and not obstruct the flow of the gas such that the flow or operation of the torch is compromised. These sensors, can then be used by the controller 101 to detect a pressure drop, if any, from the console 105 to the torch 200. FIG. 7 depicts an exemplary torch 200 with a torch head portion 200' and a torch body portion 200". As shown, the sensors 221/223 can be located in the gas connections to the torch body 200'. Alternatively, the sensors can be located in the gas lines between the torch body 200" and the torch head 200'. In further exemplary embodiments, a manifold connection (not shown) can be coupled to the upstream end of the torch body 200", where the manifold connection contains the pressure sensors 221/223. In such an embodiment, the sensors 221/223 would detect the line pressure just as the gases enter the torch assembly 200.

Further, as shown, in FIG. 1, the torch assembly includes at least a shield cap 201, a nozzle 203 and an electrode 205. Of course, the torch assembly can contain other components as well, such as a swirl ring, retaining cap, etc. As shown, the torch assembly 200 contains additional pressure sensors (e.g., transducers) to sense the pressure of the torch gases at different locations within the torch 200. For example, as shown, a sensor 202 is located on an inner surface of the shield cap so as to detect the pressure of the shield gas during operation, and a plasma chamber pressure gauge 204 is located in the cavity formed between the nozzle 203 and the electrode 205 to detect the pressure of the plasma gas within the plasma gas chamber. Again, these sensors 202/204 provide sensed pressure data to the DSP 107 and/or the controller 101 such that the controller 101 can use the sensed pressure to monitor the operation of the cutting process/torch and provide dynamic control of the cutting operation based on the detected pressures.

Because pressure sensors are placed within the torch assembly 200 and/or at other locations in the gas system, pressures can be measured at specific points in the system and provide real time feedback to allow for dynamic control of the cutting process. That is, torch input pressures, shield cavity pressures and/or plasma chamber pressures can be sensed and used to monitor and control the cutting process.

As discussed above, these sensors are in direct communication with the DSP 107 (or any similar processing device) and a controller 101, to allow the sensed pressure data to be used in controlling the operation of the cutting process. It is noted, that while the DSP 107 and controller 101 are shown as separate components in FIG. 1, these components can be located in a single unit, such as the power supply 103, a single controller, etc. Their relative location as shown in FIG. 1 is not intended to be limiting.

In exemplary embodiments, each of the gas console 105 (via the DSP 107), power supply 103 and controller 101 are interconnected via a real time, deterministic communication protocol so that real time information can be exchanged between the respective system components regarding pressures, voltage, current and motion profiles of the process can be monitored and controlled to provide an optimized cutting operation. For example, pressures within the torch and/or the console can be used in conjunction with voltage and current feedback information to develop control profiles for different torch consumables (e.g., electrode, nozzle, shield cap, etc.) to optimize performance for a given set of consumables and allow for gas flow changes as consumables wear, or the set-up of the cutting operation changes.

For example, in one exemplary embodiment of the present invention the controller 101 can use the sensed pressure within the torch 200 to determine whether or not the proper electrode, nozzle and/or shield cap is being used for a given operation. In practice, a user would enter the desired cutting parameters into the controller 101, including for example a current setting. Prior to cutting, the controller 101 can initiate a gas purge process in which a gas is passed through the torch assembly 200. The pressure sensors 221, 223, 202 and/or 204 sense a pressure of the gas during the purge process and the detected gas pressure(s) is compared to threshold values stored within the controller 101, so that a determination can be made if the proper consumables are installed.

As an example, for high current cutting operations, high current rated consumables are to be used for optimized performance. However, due to user error, there can be times where a low current consumable is left within the torch 200 without replacement, and the process is started—which could damage the consumable and/or result in poor cuts. With embodiments of the present invention, this event could be avoided. With embodiments, of the present invention, the controller 101 contains pressure threshold values for the different consumables that can be used with the torch 200. For example, the controller 101 can have preset plasma chamber pressure values for different electrodes that can be used—e.g., a first pressure value for low current electrodes, a second pressure value for mid-current electrodes, and a third pressure value for high current electrodes. Prior to cutting, a user enters the desired cutting amperage of 100 amps (low current). Then, prior to beginning the cutting operation, the controller 101 causes a purge gas to be passed through the gas console and through the torch 200. The controller 101 ensures that the gas flow to the torch 200 is at a desired purge flow pressure—which can be done via the gas console sensors 110, 112, 114, and 116 and/or sensors 119, 120. Further embodiments can use the sensors 221 and 223 at the torch as well to ensure the proper purge pressure is being supplied to the torch 200. The controller 101 then uses the feedback from the internal torch sensors 202/204 and compares the detected pressures to predetermined thresholds to determine if the internal torch pressures are at the predetermined thresholds. If the detected pressures are at the thresholds, the controller 101 determines that the proper consumables are in place within the torch 200. However, if the detected pressures are not at the desired thresholds and error message can be displayed and/or the operation can be stopped, with an indication that the consumables are not appropriate for the desired cutting operation. As a more specific example, with a desired cutting amperage of 200 amps, the controller 101 can use look up tables, state tables, etc., to determine that a pressure within the plasma chamber (between the electrode and the nozzle) should be within the range of 14 to 16 psi when the pressure at the sensor 120 is in the range of 10 to 12 psi, during a purge process (for example). The controller 101 then initiates the purge process such that the detected pressure at the sensor 120 is within the range of 10 to 12 psi. If the detected pressure in the plasma chamber is within the range of 14 to 16 psi, the controller 101 determines that the proper consumables are in place. However, if the detected pressure is below or above the threshold the controller 101 provides an indication that the consumables in the torch 200 are not correct. This would allow the user to change the consumables prior to the operation beginning and could reduce errors and damage to the consumables and the torch 200. Of course, it should be noted that the above description is intended to be exemplary, and embodiments are not limited to the specifics above.

Figure 6:
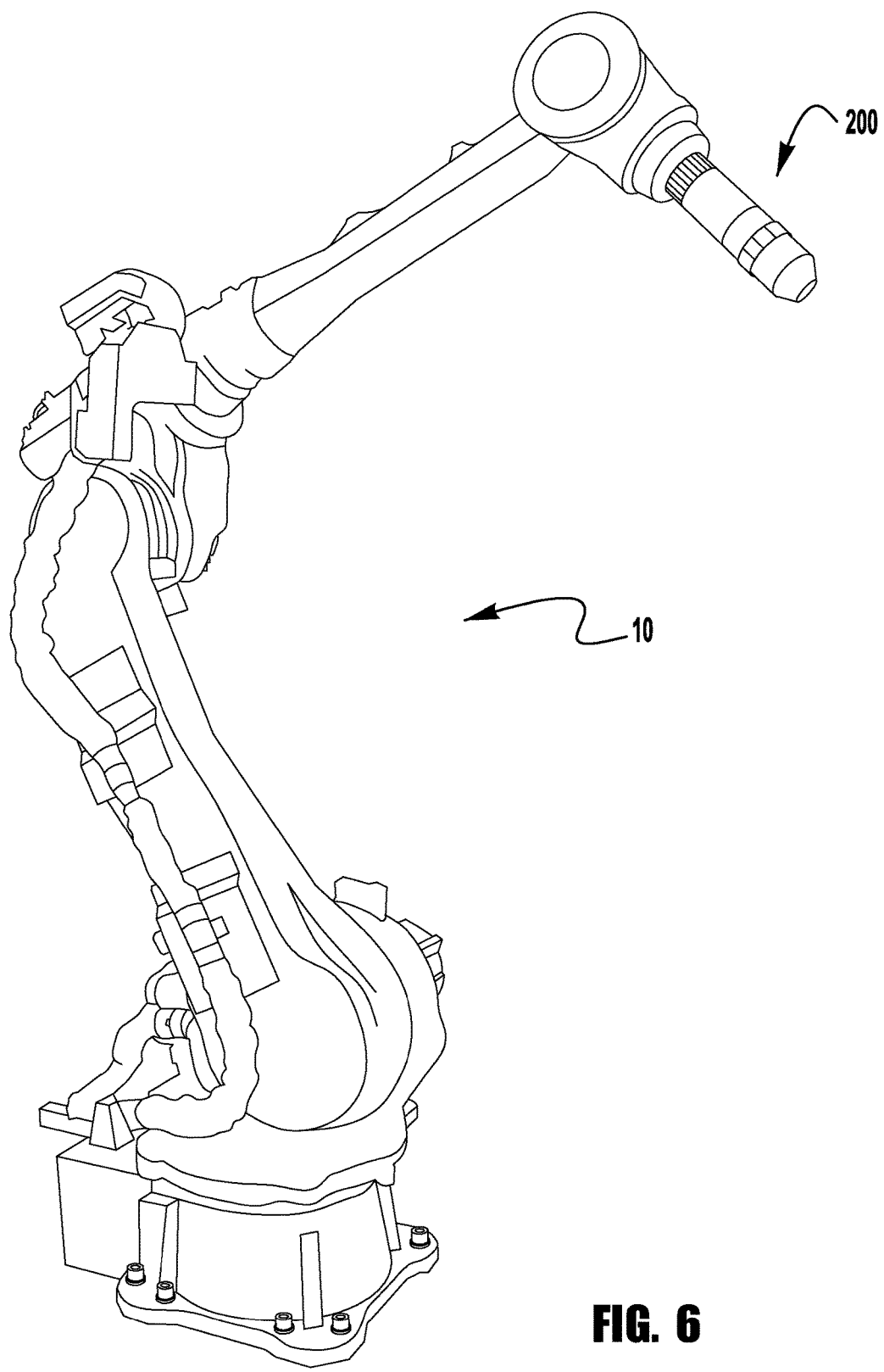
FIG. 6 is a diagrammatical representation of an exemplary robotic arc that can be used with embodiments of the present invention.

In further exemplary embodiments, the pressure sensors can be used to determine if there are any leaks or blockages between the gas console 105 (or any other gas metering device) and the torch 200. In certain situations, a leak can develop between the console 105 and the torch 200, or the gas lines can develop blockages or kinks. In previous systems, these issues would go undetected and could adversely affect the cutting operation because of the open loop control methodology with respect to pressures at the torch. In embodiments of the present invention, the sensors 119/120 and 21/223 can be used to detect if any of these issues are present. That is, the controller 101 can monitor the pressure differential between the sensors and if that differential exceeds a threshold differential value, the controller 101 can indicate that an issue exists in the lines 121/123. This can occur when a gas lines 121/123 are replaced or increased in length. In such situations, the system 100 can detect of the installation of new lines is not acceptable. Further, during operation, the controller 101 can use the detected differential to determine if the lines 121/123 kink during the cutting operation. For example, a robotic arm or gantry mechanism can move the lines 121/123 into a compromising situation, where a kink develops. The system 100 can detect the presence of the kinks/blockages and either adjust pressure to provide the desired pressure to the torch and/or provide an error message to the user indicating a blockage has been detected. An exemplary robot system 10 is shown in FIG. 6, where the torch assembly 200 is secured to the robot 10.

In additional exemplary embodiments, the system 100 can be used to determine model the gas flow profile of the system 100 and the torch 200 so that the controller 101 can develop optimized gas pressure control parameters. That is, it is understood that ever cutting system 100 has a pressure profile, where pressure drops/rises occur as the gases transition from the console 105 to the torch 200, and ultimately to the internal chambers of the torch 200 (e.g., shield gas chamber, plasma chamber, etc.). That is, when a torch 200 is assembled with the desired cutting consumables, this configuration will combine to create a gas flow profile with certain pressure drops/rises as gas passes from one region to the next within the torch 200. This can be referred to as the system gas pressure profile. Embodiments of the present invention can create a gas pressure system model based on the detected gas pressure profile and use this model to optimize gas flow during cutting, which optimizes the cutting performance.

The gas flow and timing and up slope/down slope of the current relative to gas pressures (flow) at the torch 200 is an important factor to maximize consumable life. In known systems, the timing of gas flow and current slope rates are empirically determined based on laboratory test conditions and are fixed within the controller 101. Often these fixed values represent a compromise between parameters and are set based on a specific system set up and configuration. However, because all industrial applications of cutting systems are different, using different torches, and other components, these compromise parameters are not optimal for most cutting operations. For example, changes in hose lengths and/or variations in system components (valve delays, CV constants) will impact the timing of gas switching and associated current slope rates resulting in less than optimal consumable life. Because exemplary embodiments of the present invention directly measure the pressures (flows) at, or in, the torch 200, the power supply upslope/downslope rates can be dynamically controlled relative to the torch pressures which can provide optimal performance. That is, knowing the pressure at the torch 200 and/or within the torch chambers, in conjunction with the developed system model, the gas profiles during cutting can be dynamically controlled utilizing controlling of the valves in the gas console 105 and the vent valve at the torch 200 (not shown).

To accomplish the above, in exemplary embodiments of the present invention, static pressure differences can be measured throughout gas system of the system 100 prior to a cutting operation. These static pressure differences can be detected using the sensors described above an shown in FIG. 1, and detect the pressures at different locations. By measuring and recording the static pressure differences of the different gas flow locations in the system, the controller 101 can determine relative pressure drops/rises through the system 100 and use these ratios to adjust its gas flow control methodology to optimize the gas flow synergies with the cutting current and operation. Further, pressure rise and fall ratios and times (that is, the time lag between pressure increases/decreases) throughout the system 100 can be detected and recorded during a flow of gas through the system 100 (e.g., during an initial gas purge stage). For example, the system 100 can use the processes described above to determine that it will take 1.5 seconds for a pressure rise in the gas console 105 to reach the torch 200. Using this information, the controller 101 can now know that a time lag of 1.5 seconds exist from the initiation of a pressure increase at the gas console. These pressure drops/increases during gas flow can be similarly utilized by the controller 101 to determine the gas flow profile of the system, and thus develop a gas flow model for a given cutting operation. That is, the controller 101 will use the developed gas flow model and the anticipated current/voltage profiles for a cutting operation to optimize the control of the gas flow. For example, the controller 101 may initiate a pressure rise or pressure drop in the gas flow (e.g., via control of the valves on the gas console) so as to coordinate pressure increases/decreases to accurately coincide with current changes. That is, with the gas system model, the controller 101 can now dynamically control and synchronize changes in the gas flow rate (increase or decrease) so as to optimize the cutting. This capability is not possible with known systems.

Figure 4:
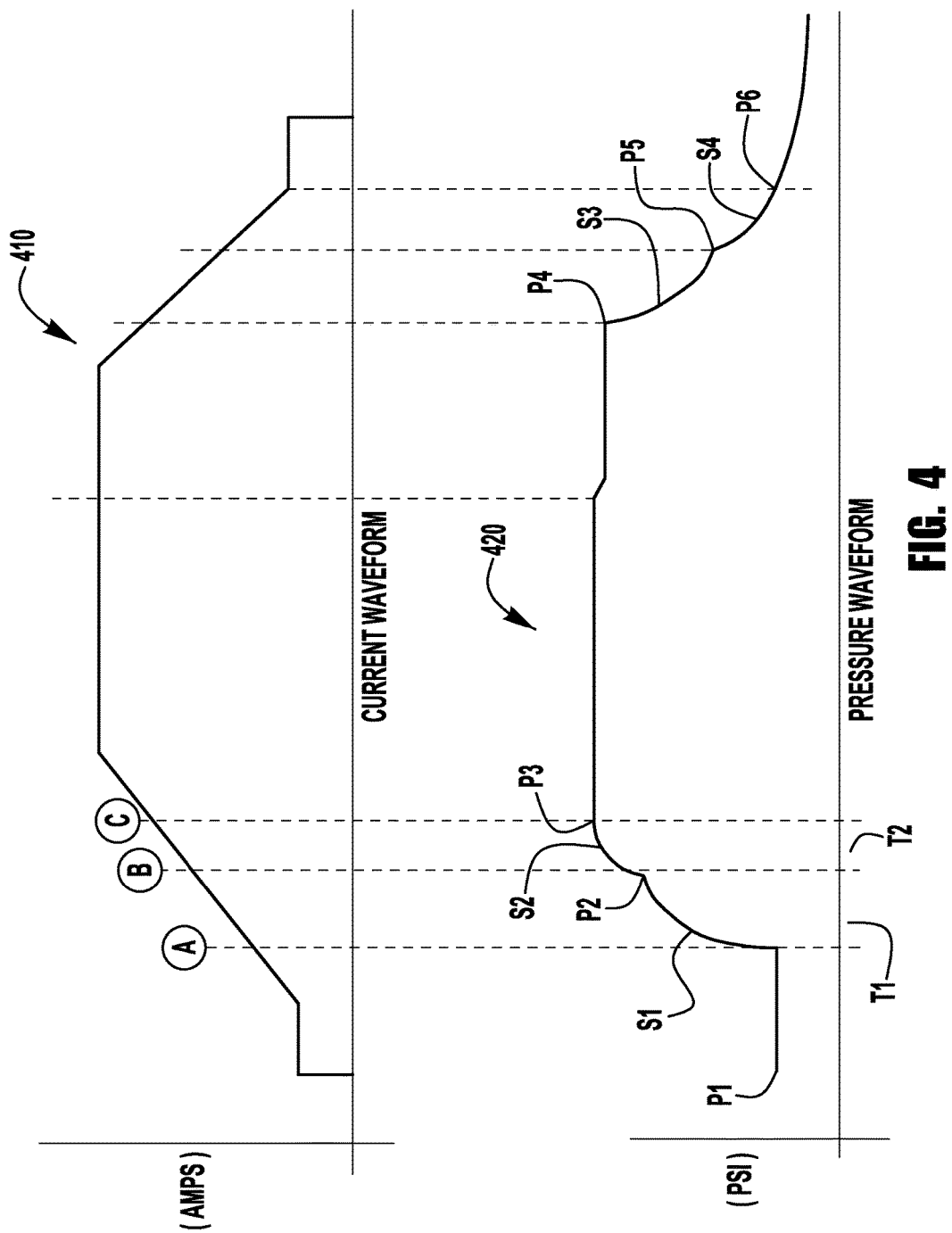
FIG. 4 is a diagrammatical representation of a current and pressure profile for a cutting operation.

As an example, FIG. 4 depicts an exemplary current waveform 410 and pressure profile 420 for a cutting operation. As can be seen, at different stages of the cutting process the pressure requirements are different. That is, in the beginning of the process the pressure will need to be increased from a beginning pressure P1 to P2 and then ultimately the peak pressure P3. With exemplary embodiments of the present invention, the controller 101 can use the developed gas system model for the system 100 so as to determine the optimal times to initiate changes between pressure levels. For example, using programming and logic in the controller 101, the controller 101 may determine that when the current reaches point B in the cutting process, the gas pressure will need to be at pressure level P2. Using the developed gas system model stored in the controller 101, the controller 101 can calculate and determine the time needed, or time lag T1 to get from the first pressure level P1 to the second pressure level P2, and using this information will initiate the pressure increase beginning at point A so that the pressure will reach P2 at the proper time, relative to the current (at point B). Similarly, the time lag T2 can be determined to get from the pressure P2 to pressure P3. Similarly, the pressure change rates or slope can be determined for pressure changes from one level to another. As shown in FIG. 4, there are pressure change slopes (S1, S2, S3 and S4) for a given system as pressure changes from one level to another. The system 100 detects and records these slopes (e.g., via a calibration process, or other similar process) and uses these slope profiles to develop the gas model discussed herein. Thus, systems of the present invention can use determined time lags and/or slopes to develop a gas model to be used with a gas profile to provide optimized gas flow control during a cutting operation, and to ensure that the gas pressure profile is synchronized in an optimal fashion with a cutting operation. This cannot be achieved with known systems.

Using the above described methodology, embodiments of the present invention can develop a gas system model for a given grouping of torch components so that the model can be used to more accurately and dynamically control the pressure. Not only will this greatly improve cutting techniques, but will also result in increased torch component life.

In further exemplary embodiments, not only can the system 100 be used to develop a gas system model for a given grouping of torch components, but it can also be used to determine gas flow characteristics based on relative positioning and/or motion of the torch 200. Many known cutting systems either use a robot arm or a gantry type structure to move the cutting torch 200 around during the cutting operation. Because of this movement, and its effect on the gas lines 121 and 123, the gas flow/pressure can be different at different torch orientations or locations during a cutting operation, even though the supplied gas pressure remains constant. For example, even though the gas console is providing a constant gas pressure of 15 psi, at a first location on a cutting table the torch receives the full 15 psi, while at a second, more distant location, the torch only receives 13.5 psi. This, again, can adversely affect the cutting operation and the usable life of the torch components. Thus, exemplary embodiments of the present invention can develop a gas system model based on torch orientation and/or positioning in an automatic or semi-automatic cutting system. For example, prior to cutting, the controller 101 can initiate a calibration operation, where a fixed gas pressure is provided to the torch 200 (e.g., 15 psi at the gas console 105), and then the torch is moved to different locations within its cutting area, and if on a robotic arm moved to different locations at different orientations. The calibration can be done either during a calibration process or dynamically while during a cutting operation. For example, if correct pressure is not measured at the torch the pressure at the console can be adjusted to compensate for the pressure differential or the system can initiate a fault. As this is done, the sensors will constantly monitor the line and/or torch pressure to identify and record changes in the torch pressure as the torch is moved. For example, the system 100 can determine that when the torch 200 is within a first area of the work surface the pressure is at the expected 15 psi, but when the torch 200 transitions to a second area on the table, the pressure drops to 13.5 psi. The controller 101 then uses this information to develop the gas system model such that during cutting, when the torch is moved to the second area the controller 101 adjusts the system pressure (via the console 105) to ensure that the torch pressure is the needed 15 psi. This cannot be achieved with known systems. Similarly, in systems using a robotic arm with a multi-axis range of motion, the controller 101 can determine that when the torch 200 is at a first orientation no adjustment to the pressure is needed, but when the torch reaches a second orientation (e.g., torch up, torch horizontal, etc.) the pressure level needs to be adjusted to ensure the proper pressure is at the torch 200. Of course, in all of these embodiments, the pressure can be adjusted via the controller 101, DSP 107 and valves on the gas console 105.

In embodiments of the invention, the controller 101 can use the pressure sensors, and a calibration function to determine time delays for pressure increases and decreases from the gas console to the torch 200 and/or slope rates for pressure increases and decreases from the gas console to the torch 200. As described above, this information can be used by the system 100 to dynamically control and/or synchronize the gas pressure with the cutting operation to achieve an optimized process.

In addition to the foregoing, embodiments of the present invention can also be used to detect the formation of defects in torch consumables during cutting. As is known, torch consumables, such as shield caps, nozzles, electrodes, etc. degrade over time. Once these consumables reach a certain degradation level they do not function properly, thus compromising the cutting operation. Exemplary systems of the present invention can use the developed gas system model to watch for and/or predict consumable failures. As explained above, sensors 204/202 can be located within the torch assembly such that they monitor gas pressures in the torch 200 during cutting. That is, the controller 101 can determine, or be preprogrammed with, an optimal gas pressure range for at least one of the plasma chamber and the shield cavity, and when the pressures within these regions fall outside the acceptable ranges a warning can be displayed or the cutting operation can be stopped. For example, during calibration the controller 101 determines that for a given torch assembly/configuration when the console pressure is at 15 psi, the shield cavity pressure should be within the range of 13 to 14 psi. (It is noted that this determination can be made via using state tables, look up tables, algorithms, or any other known methods for programming system controllers.) If during a cutting operation, the pressure in the shield cavity falls outside of the acceptable range (or a determined threshold value) the controller 101 determines that the shield cap is failing or has failed and either shuts off the cutting operation, or displays a warning to a user. For example, if the end orifice of the shield cap is compromised such that the hole in the cap has been made larger, the pressure in the shield cavity could drop to an unacceptable level. This drop can be detected by the controller 101 and the system 100 can react appropriately. In some embodiments, not only will the system provide a warning, but the system 100 can also adjust the shield gas pressure (via the gas console 105) to ensure that proper shield gas pressure is achieved during cutting. For example, if the controller 101 determines that there was an unacceptable drop in shield gas pressure, the controller 101 can cause the gas console to increase the gas flow/pressure of the shield gas until the shield cavity pressure reaches the proper level. In fact, in some embodiments, multiple thresholds or operational ranges can be used to allow cutting to continue before the system is turned off. For example, for a given cutting operation and torch configuration, the controller 101 determines an acceptable shield gas pressure range of 13 to 14 psi, and so long as the detected pressure is in this range no pressure change is initiated. However, if the shield cavity pressure falls outside of this threshold/range, but remains within a second determined range, the controller 101 maintains the cutting operation, but adjust the pressure appropriately via the gas console 105. For example, the second acceptable ranges can be 12 to 13 psi and 14 to 15 psi, where if the detected pressure falls within these ranges the controller 101 will simply adjust the supplied pressure via the gas console 105. These smaller increases/decreases can be cause by small blockages, diameter changes of the shield cap opening which do not require stoppage of the cutting operation. In such a situation, the controller 101 can display a warning that a gas flow issue has been detected for the shield gas, but maintains cutting. However, if the detected pressure falls outside of the second acceptable range, the controller 101 can initiate a stop to the cutting operation, because this would indicate a more significant failure that cannot, or should not, be mitigated with gas pressure adjustments. For example, if the shield cavity pressure drops below 12 psi, this can indicate a significant failure or hole in the cap. It should be noted that the above discussion, is only intended to be exemplary and can be equally applied to the plasma chamber pressure, etc.

As discussed above, the system 100 can use a calibration process to develop a gas system model for a give torch/system set up. The controller 101 can use this model, along with user input information, to control the gas pressure during a cutting operation. For example, the controller 101 can use data inputs such as, material thickness, cutting current, material type, gas type, etc. to develop the optimal gas pressure waveform (42) for a given cutting operation. Further, during cutting, the system 100 can use the above described process and sensors to dynamically make the needed adjustments to the gas pressure to achieve the desired.

In further exemplary embodiments, the controller 101 contains a look up table for different consumable types and torch configurations, such that a user can enter consumable/torch information into the system and the controller 101 uses this information (in conjunction with look up tables, etc.) to develop a gas system model for the configuration. For example, a user can enter a part number or part type for the electrode, shield cap, nozzle, swirl ring, etc. and the controller 101 uses this information to develop a gas system model. Further, as explained above, the system 100 can then a run a pre-cutting diagnostic check or calibration step to verify that the consumables in the torch 200 perform as predicted. If the calibration results in a detected pressure outside of the anticipated ranges/thresholds, a warning message can be displayed to require check of the consumables for verification. Of course, other advantages can be achieved and contemplated with the systems 100 described herein, and uses of the embodiments described herein are not limited to the express descriptions above.

Figure 2:
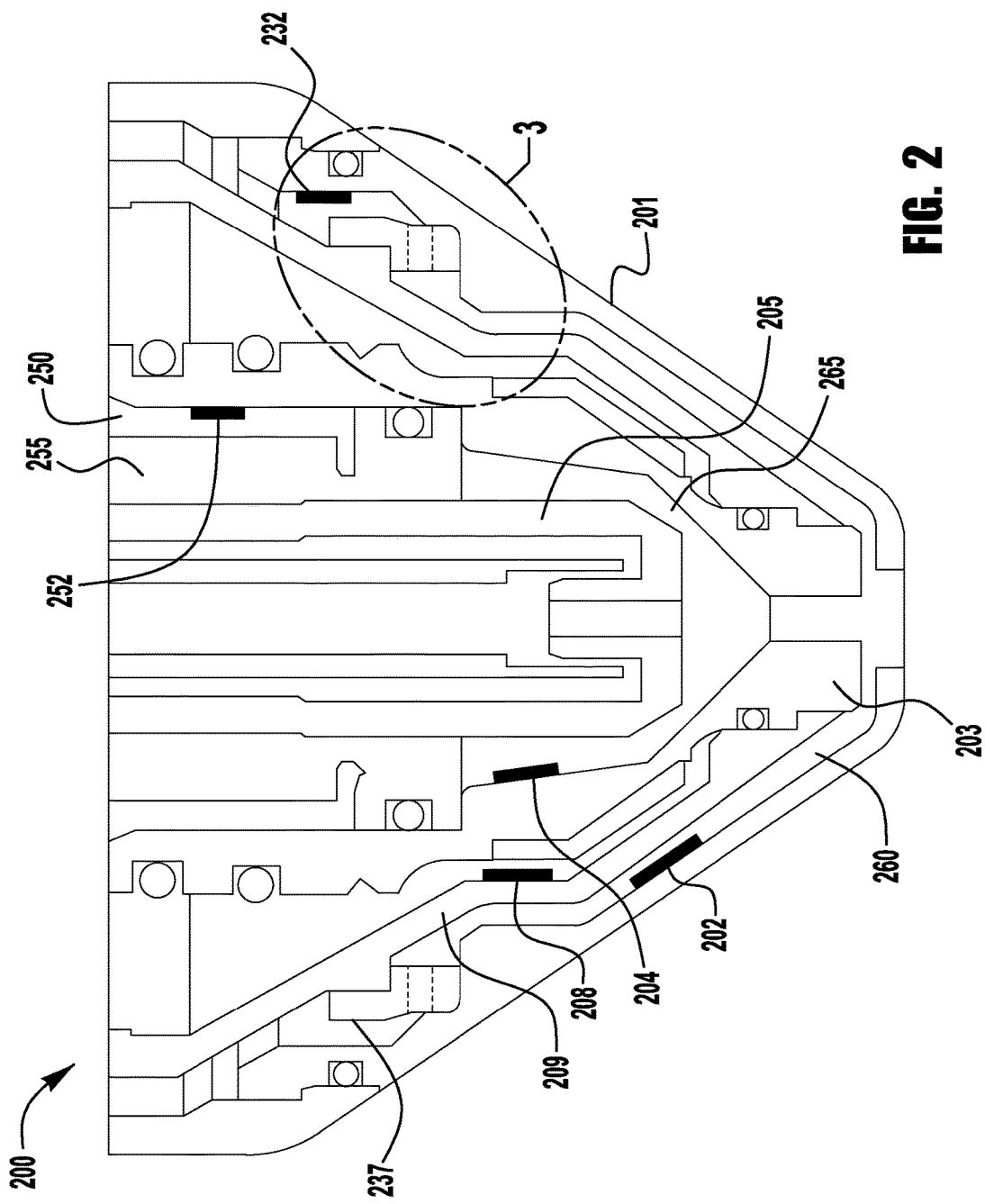
FIG. 2 is a diagrammatical representation of an exemplary torch head of the present invention.

Turning now to FIG. 2, the distal end of an exemplary torch 200 is shown. Because the general construction of torches is known, those details will not be discussed herein. As shown, the torch 200 has a shield cap 201, a nozzle 203, an electrode 205, a swirl ring 255, and an inner retaining cap 209. It is noted that the configuration depicted in FIG. 2 is intended to be exemplary and torches that can be used with embodiments of the present invention are not limited to this configuration. As shown, the shield cap 201 and the inner retaining cap 209 create a shield gas cavity 260 through which the shield gas passes. As explained above, a pressure sensor 202 is located within this cavity to detect the shield gas pressure during calibration/cutting. As explained above, the sensors described herein can be any type of pressure transducer, sensor, etc. which is capable of detecting the desired pressures and handle the heat loads experienced during cutting. Such sensors are generally known and need not be described herein. As shown in FIG. 2, the sensor 202 is coupled to an inner wall of the shield cap 201. In other embodiments, the sensor 202 can also be installed on an outer surface of the inner retaining cap 209. So long as the sensor 202 can detect the shield gas pressure, its location is not limiting.

Similarly, the nozzle 203 and the electrode 205 also create a cavity, the plasma chamber 265. The pressure sensor 204 detects the plasma gas pressure within this cavity 265, which is used as discussed above. Again, while the sensor 204 is shown on the inner wall of the nozzle 203, it can also be placed on an outer surface of the electrode 205, or at any other location allowing the senor 204 to accurately detect the pressure in the chamber 265.

As shown in FIG. 2, in other exemplary embodiments, the torch 200 can include additional pressure sensors that can be used to detect gas flows at different locations, which can be used to control the gas flow during cutting to achieve optimal cutting results, increase usable life of the torch 200 and detect issues during cutting. As shown, a sensor 252 can be placed within the swirl ring cavity 250 which exists between the swirl ring 255 and the nozzle 203. Another sensor 232 can be placed upstream of the shield gas swirler 237. This sensor allows for the detection of shield gas pressure both upstream of the swirler 237 and within the shield gas cavity 260 (sensor 202). This is shown in more detail in FIG. 3, where the sensors 232/202, are upstream and downstream of the swirler 237, respectively. As shown in FIG. 2, in other exemplary embodiments, a sensor 208 can be placed in the region formed between the inner retaining cap 209 and the nozzle 203. Of course, it should be understood that embodiments can use any number and/or combination of the above torch sensors without departing from the spirit and scope of the present invention.

Figure 5A:
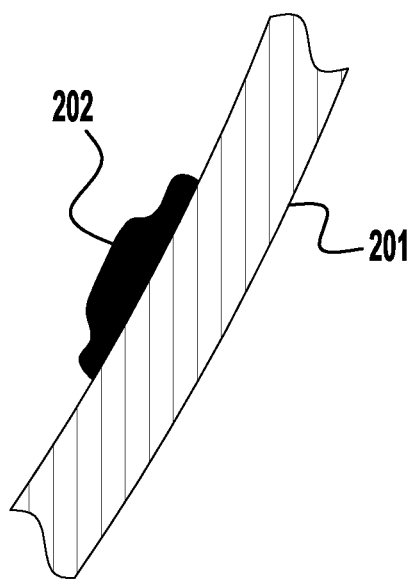
FIGS. 5A and 5B are diagrammatical representations of exemplary pressure sensor mounting techniques.
Figure 5B:
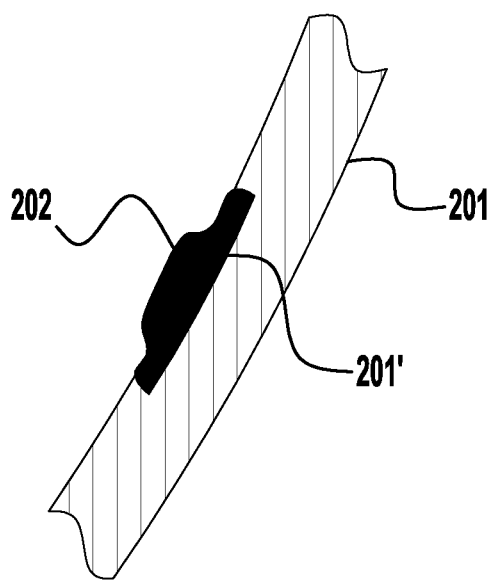

Turning now to FIGS. 5A and 5B, different mounting configurations for the sensors is shown. FIG. 5A depicts a surface mounting configuration of the sensor 202 on the inner wall of the shield cap 201. When using a surface mounting configuration, the sensor 202 should be positioned such that it does not adversely affect the flow of the gas through the cavity. FIG. 5B depicts a recessed mounting configuration, where the a recess cavity 201' is created on the component (in this case the shield cap 201) so that the sensor 202 provides less of an obstruction for the gas flow. Various embodiments can use these, and other mounting configurations. Further, any given torch 200 can use a combination of flush and recessed sensor mountings as needed. The sensors can be secured by any known means, including adhesives or structural connections.

Figure 8:
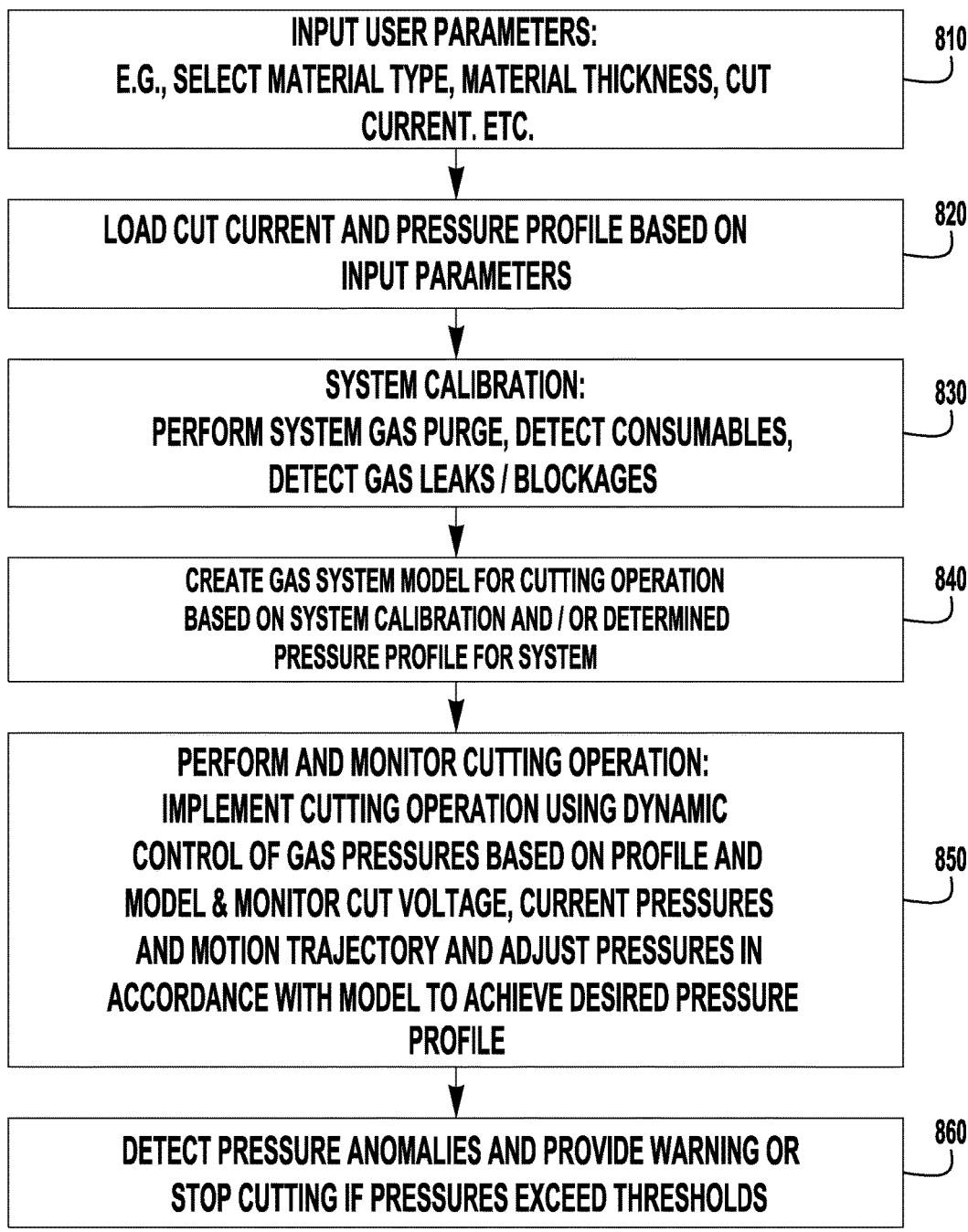
FIG. 8 is a process flow chart for an exemplary cutting process using a system of the present invention.

Turning now to FIG. 8, an exemplary flow chart is depicted which generally shows a process which utilizes exemplary embodiments of the system 100 described herein. The flow chart can be used with the following discussion which is a general description of an exemplary process or method of using exemplary embodiments described herein. In step 810 a user would enter input parameters for a cutting operation into the system 100. This can be done via any know user interface, which is coupled to the controller 101. Input parameters can include: material type, material thickness, cut current, a cut pattern or load file for the cutting operation, torch type information, consumable identification information, etc. Based on this information, the controller 101—which can be coupled to any memory device—will use the input parameters to develop a current and pressure profile for the cutting operation (see e.g., FIG. 4). This is the current/pressure profile that will be used for the desired cutting operation. In step 830, the system 100 can perform a calibration and/or a pressure check. For example, the system can institute a gas purge, in which each of the shield gas and plasma gas is purged through the system 100 without any cutting operation being performed. During this calibration, the gas pressure provided to the torch 200 via the gas console 105 at a desired fixed pressure from the console 105. For example, the fixed pressure can be 15 psi at the sensors 119 and 120, and the controller 101, DSP 107 and valves in the console 105 will be controlled to obtain the desired 15 psi. As the gases flow through the system 100 the pressures can be detected at the different sensor locations at torch 221/223 (which can be at the end of the torch body, or the torch head, or both) and the sensors 202, 204, etc. within the torch 200. During the calibration, the DSP 107 and/or controller 101 receives the feedback signals from the various sensors and can determine that there are no line leaks, there are no line blockages, and detect the consumables in the torch 200. This detection process can include using the detected pressures to detect the type of consumables within the torch 200 and detect whether or not the consumables are appropriate for the given cutting operation and/or can include detecting whether or not the gas pressure profile detected is consistent with the type of consumables entered via a user in step 810. If the detected consumables are not accurate, a warning message can be displayed. The controller 101 can also use the detected pressures to provide a warning to the user that there may be an issue with one or more of the consumables in the torch 200. For example, the controller 101 can detect if a consumable is damaged or not performing consistent with its anticipated performance and a warning message can be displayed requiring the user to inspect/replace the consumables. Not only can this calibration be done with the torch 200 stationary but it can also be done as the torch is moved around the work area via a gantry (on a table system) or via a robot, so that different pressure readings are taken at different torch positions and orientations. Additionally, a static pressure calibration can also be done as part of the calibration test. In some embodiments, the static test can be accomplished by blocking the exit of the torch 200, or any other acceptable means.

After the system 100 calibrates itself and the all of the detections conclude that the appropriate consumables are in the torch 200 and are in acceptable working order, the controller 101 creates a gas system model to be used by the controller 101 for the cutting operation. As described above, the gas system model will be used by the controller 101 in conjunction with the desired pressure profile for the cutting operation to allow the controller to provide the gas flow to the cutting operation as desired to achieve a highly optimized cutting operation. The model will take into account the detected pressure ratios between components, and within the torch 200, and pressure drop/increase lags, slopes and/or rates, relative to pressure changes from the gas console 105. That is, by using the model and desired profile, the controller 101 can control the gas console 105 such that the desired gas pressures are achieved exactly when needed at the cutting operation. This cannot be achieved with known systems.

In step 850 the cutting operation is performed using the desired profile and the model to control the current, voltage, torch movement, gas pressure, etc. During the cutting operation, the gas pressures at the sensors are monitored and real time feedback is provided to the controller 101, so that a determination is made that the desired gas pressures are being provided. Additionally, during cutting the gas pressures are dynamically controlled to match the desired gas profiles, and the gas pressures/flows are changed at the gas console 105 based on feedback from the sensors so that the desired gas profiles are maintained.

In step 860, because the pressures are constantly being monitored, if a pressure anomaly is detected, and it is determined that the pressure anomaly (e.g., a detected pressure different from a desired pressure profile) cannot be addressed by a simple pressure change via the gas console 105, then a warning notice can be provided to the user, or the cutting operation can be stopped, based on the severity and type of pressure divergence detected.

Figure 3:
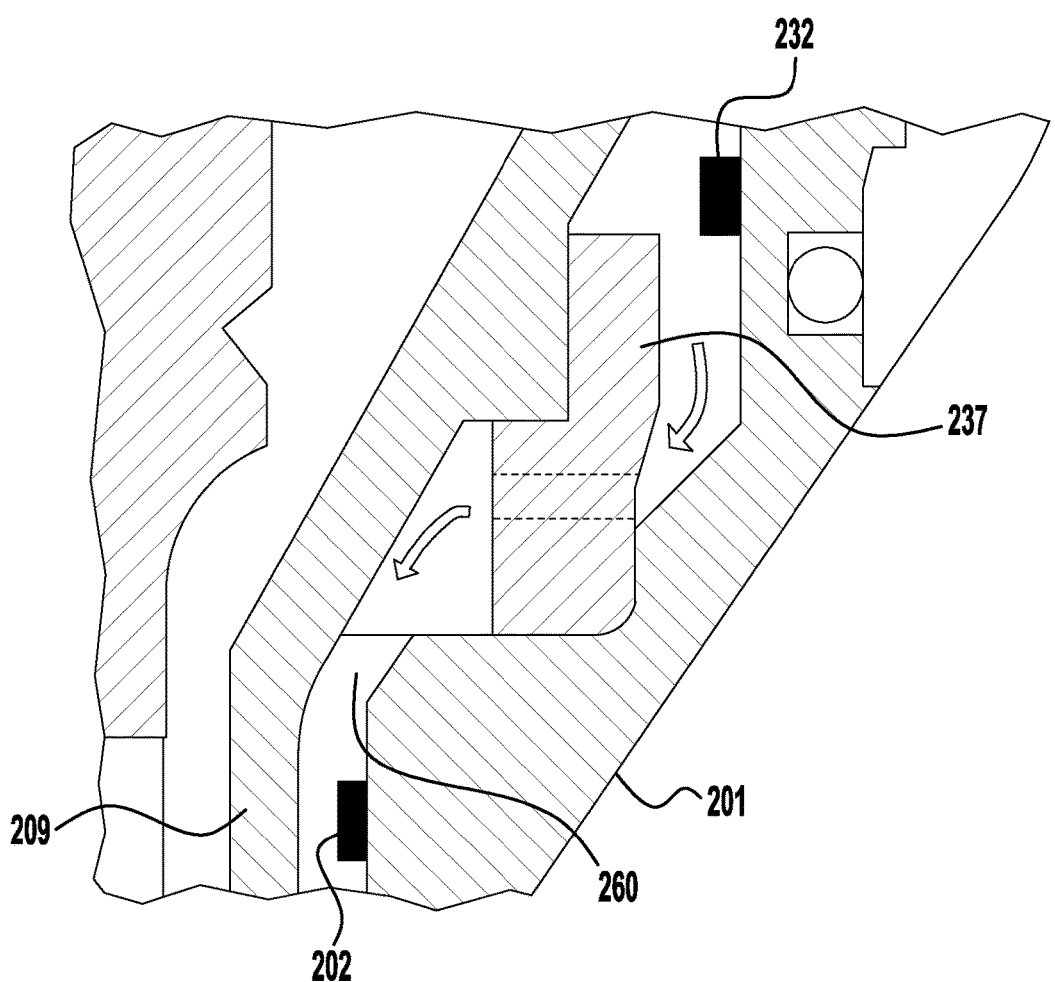
FIG. 3 is a diagrammatical representation of a further view of the torch head shown in FIG. 2.
Figure 9:
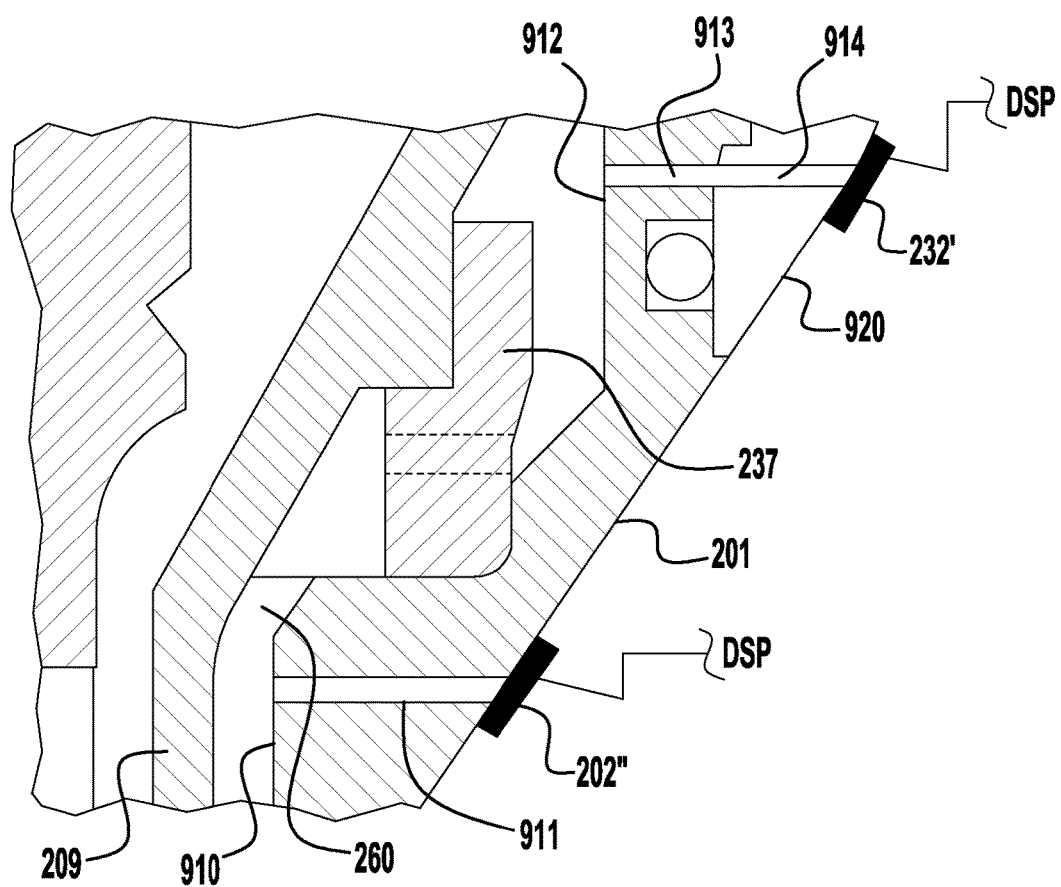
FIG. 9 is a diagrammatical representation of a further exemplary embodiment of the present invention.

FIG. 9 depicts a further exemplary embodiment of the present invention. Specifically, the embodiment shown in FIG. 9 is similar to that shown in FIG. 3. However, in this exemplary embodiment the pressure sensors 202' and 232' are located outside of the respective cavities for which they are to measure pressure. Unlike the embodiments discussed previously, pressure ports/channels are used to allow the pressure sensors to sense the respective pressures. Such an embodiment can allow for easier placement of the sensors and coupling of the sensors to the DSP. As shown in FIG. 9, the sensor 202' (which detects shield gas pressure) is positioned on an outer surface of the shield cap 201 and is coupled to the shield gas cavity via a pressure channel 911, which couples the sensor 202' to an inner surface 910 of the shield cap 201. The channel 910 is configured such that it allows the sensor 202' to accurately detect the pressure within the shield gas cavity, but does not interfere with the desired flow of the shield gas. Similarly, the sensor 232' is also located on an outer surface of the torch assembly (the shield cap retainer 920) and has a pressure channel which couples the sensor 232' to the shield gas cavity upstream of the component 237. However, in this case the pressure channel has two portions—a first portion 913 which passes through the shield cap 201 and a second portion 914 which passes through the shield cap retainer 920. Of course, these channels connect with each other such that the sensor 232' can accurately detect the pressure of the shield gas as needed. The pressure channels can be positioned and configured as needed so that the pressure sensors can be positioned on the torch assembly so as to allow for easy electrical coupling of the sensors to the DSP or any other controller used by the system. Moreover, in other exemplary embodiments a combination of sensors on the outside of the torch assembly (as shown in FIG. 9) and a sensors positioned within the cavities (as shown in FIGS. 2 and 3) can be used. For example, the use of pressure channels can also be used on other torch components, such as the nozzle 203, the swirl ring 255, and the retaining cap 209. Thus, like that shown in FIG. 9, each one of, or a combination of, these components (along with those shown in FIG. 9) can use pressure channels in their respective wall surfaces to direct pressure to a remotely positioned pressure sensor to detect the respective desired pressure. That is, the actual sensors can be positioned on the outside of the torch assembly or can be positioned in other remote positions within the torch, where the pressure channels direct allow the sensors to detect the respective pressures. For example, the sensor 204 (in FIG. 3) can be positioned on an outer surface of the nozzle 203 and a pressure channel extends from the sensor to an inner wall surface of the nozzle to detect the pressure within the cavity 265. This can aid in keeping the sensors out of a gas flow and away from high heat conditions. In such embodiments, the pressure sensors can be positioned anywhere on the torch assembly where they can provide the desired feedback/electrical signals to the DSP/controller and be able to read the desired pressures—whether through pressure channels or directly within the cavities.

Figure 10:
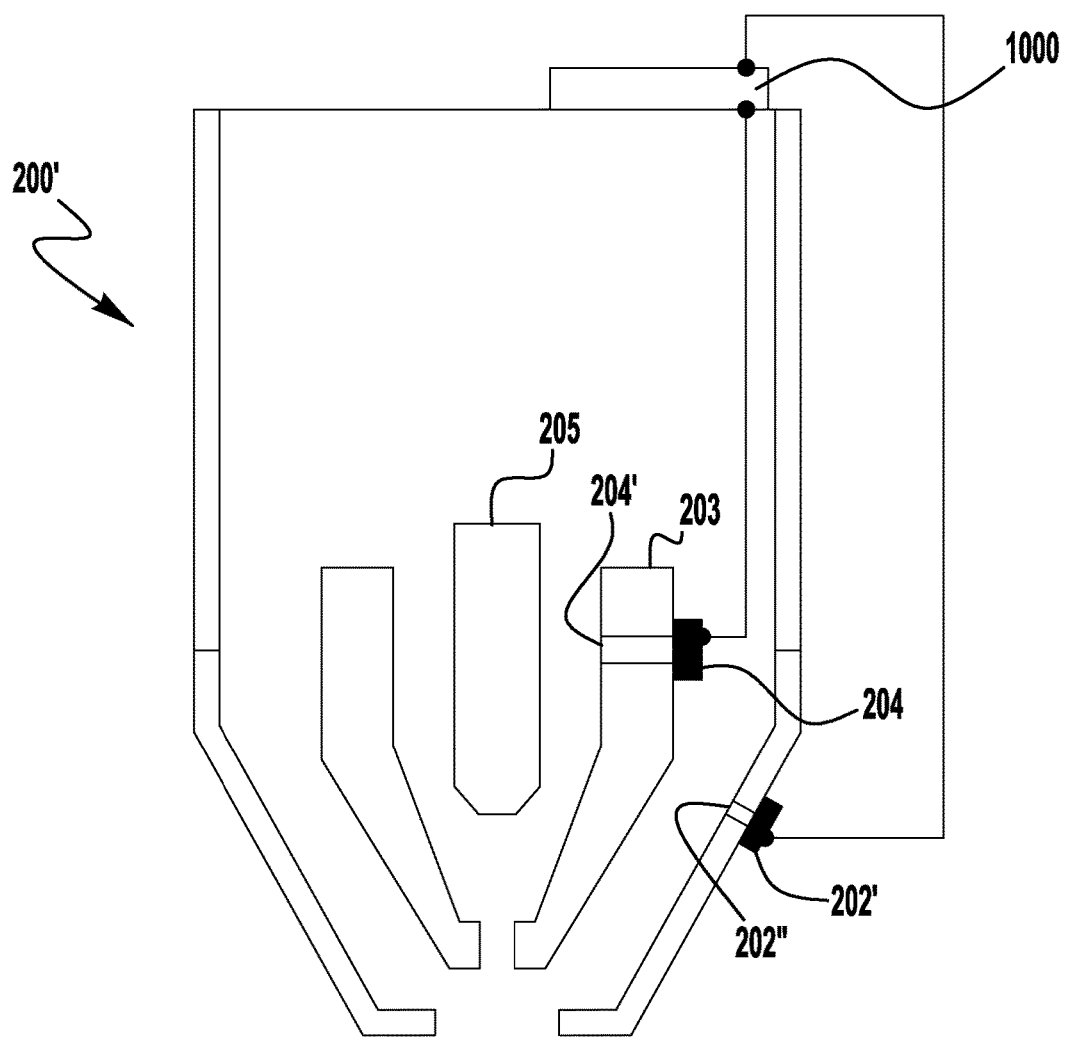
FIG. 10 is a diagrammatical representation further exemplary embodiment of a torch of the present invention.

FIG. 10 depicts an exemplary embodiment of a torch body where the nozzle 203 uses a pressure channel 204' to provide the plasma gas pressure to the sensor 204 and the shield cap 201 has a channel 202" to provide the shield gas pressure to the sensor 202'. As shown, the torch also includes a PCB 1000 to which each of the sensors are electrically coupled. The PCB 1000 can be any type of circuit board or device which receives the signals from the sensors and passes them on to the DSP/controller as needed for the desired control. The PCB 1000 can use any type of known electrical connection to couple the PCB 1000 to the system.

Figure 11:
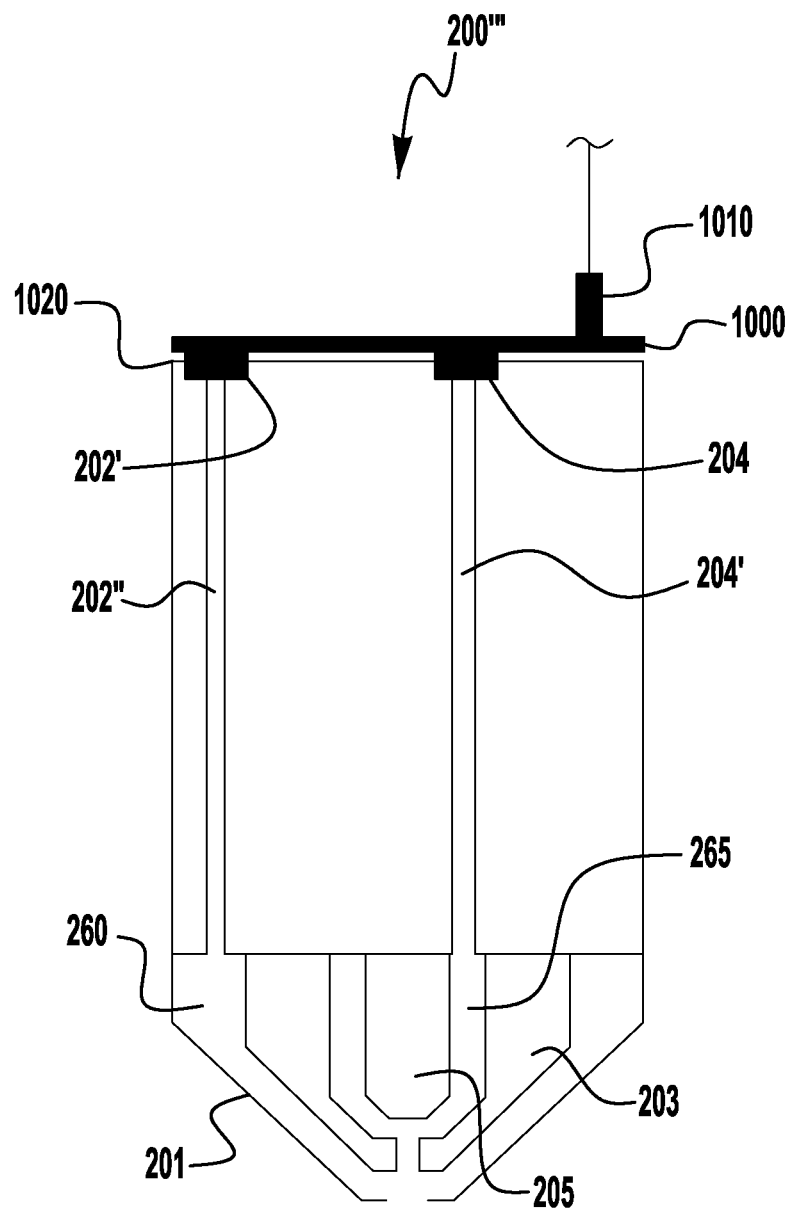
FIG. 11 is a diagrammatical representation of an additional exemplary embodiments of a torch of the present invention.

FIG. 11 is yet a further exemplary embodiment of the present invention, which operates similar to what is shown in FIG. 10. In this embodiment the torch head 200''' has an upstream end 1020 which couples with a torch body or other connection piece to secure the torch head 200''' as needed. On this end 1020 is a transducer PCB 1000 which has each of the sensors 202' and 204 coupled to it. This configuration can place the sensors away from the cutting operation and protect them from the environment. In exemplary embodiments, these sensors and the PCB will be located in a cavity created by the torch head 200" and the torch body (see item 200" in FIG. 7). Unlike the embodiment shown in FIG. 10, in this embodiment the pressure channels 202" and 204' run along a length of the torch head 200''' and extend to the upstream end 1020. Of course, the channels 202" and 204' should be obstruction free and provide a sealed conduit to the sensors, to ensure an accurate pressure reading for each of the shield and plasma gases. Embodiments of the present invention are not limited to the physical routing of the channels 204' and 202" through the head 200" so long as an accurate chamber pressure reading can be achieved by the sensors. Also, coupled to the PCB 1000 is a communication device 1010, which can be a serial communication device or a device to send analog signals. Embodiments are not limited in this regard. The communication device 1010 sends signals to the DSP which represent the detected pressures, and this information is used to control the operation of the systems as described herein. Of course, as with FIG. 10, other exemplary embodiments are not limited to positioning the sensors/pressure channels as shown. Other locations and configurations can be used without departing from the spirit or scope of the present invention.

Of course, it should be noted that the above methods and processes are intended to be exemplary, and other exemplary embodiments can use different processes and procedures, and will not depart from the spirit or scope of the present invention.

The controller 101 can be any known type of computer/ processor, or CNC controller device which is capable of controlling an automated or semi-automated cutting system. Further, the controller 101 can be coupled to a memory device which stores information necessary to implement embodiments of the present invention, including pressure profiles for different torches, consumables etc. This information can be set and determined by the system manufactured and/or tailored by a user based on historical data and operations. Moreover, the controller 101, and any memory device, can record and store gas system models and/or gas profiles for any given operation and/or torch assembly. In such embodiments, a user can use a user input device and the controller 101 to select a torch assembly (having a specific identifier in the system) and/or a specific process, and the controller 101 can recall or recover a gas model for the specific selection. In such embodiments, the calibration process can be used to verify that the stored model matches the actual torch installed.

In further exemplary embodiments, the torch assembly 200 can have an identifier that is automatically read and recognized by the controller 101, such that the model for that torch 200 is immediately called up, without user input. For example, the torch 200 can have an RFID type, or other electronically readable identifier, which is individual for that torch assembly 200 such that when the torch is installed in the system the controller 200 recognizes the torch and selects the appropriate gas model for that torch.

It should be noted that multiple different types of control methodologies can be used to control the system described herein. For example, the controller/CNC 101 can be used to exclusively control the gas flow, while in other embodiments the DSP 107 can be used to control the gas flow, to ensure the proper pressures are achieved. For example, in an exemplary embodiment the CNC/controller 101 (or any other type of control system) can provide the process set parameters (e.g., gas type, gas pressures/flows, current rating, consumable type, etc.) based on user inputs, and the gas control DSP 107 interfaces with the pressure sensors and performs the overall pressure control to maintain the desired pressure set points provided by the controller 101. Of course other control methodologies and ideologies can be used without departing from spirit or scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A plasma cutting system, comprising:
   a gas flow control system having at least one gas flow valve which controls the flow a gas through said gas flow control system, and a first gas pressure detection device which detects a first location pressure of said gas downstream of said at least one gas flow valve;
   a cutting torch assembly coupled to said gas flow control system to receive said gas, where said cutting torch assembly comprises a second gas pressure detection device which detects a second location pressure of said gas downstream of said first gas pressure detection device;
   a gas line located between the first gas pressure detection device and the second gas pressure detection device, wherein said gas is supplied to the cutting torch assembly from the gas flow control system through the gas line;
   a power supply operatively connected to said cutting torch assembly to provide a cutting current amperage to the cutting torch assembly; and
   a controller operatively coupled to each of said first and second gas pressure detection devices, to said at least one gas flow valve, and to said power supply, where said controller controls an operation of said at least one gas flow valve based on gas pressure feedback signals from each of said first and second gas pressure detection devices to provide a desired pressure level of said gas at said cutting torch assembly,
   wherein said desired pressure level is determined by said controller based on at least one of a condition of said plasma cutting system and a parameter of a cutting operation,
   wherein said gas is either a plasma gas or a shield gas,
   wherein said controller dynamically changes said desired pressure level during the cutting operation, based on a detected gas flow profile for said plasma cutting system determined by said controller using said first and second gas pressure detection devices, in timed coordination with changes to the cutting current amperage by said controller, and
   wherein said detected gas flow profile models pressure change time lags within the plasma cutting system.

2. The plasma cutting system of claim 1, wherein said second location pressure is a pressure of said gas flow as said gas enters said torch assembly.

3. The plasma cutting system of claim 1, wherein said second location pressure is in either a shield cavity pressure or a plasma chamber pressure of said torch assembly.

4. The plasma cutting system of claim 1, wherein said detected gas flow profile for said system is determined by said controller during a calibration gas flow of said plasma cutting system, using said first and second gas pressure detection devices, prior to initiation of the cutting operation.

5. The plasma cutting system of claim 1, wherein said controller detects a type of a consumable coupled to said torch assembly based on feedback from said first and second gas pressure detection devices.

6. The plasma cutting system of claim 1, wherein said controller is configured to detect a pressure differential between said first and second pressure locations that exceeds a predetermined threshold, and determine a leak or blockage of said gas line when said pressure differential exceeds the predetermined threshold.

7. The plasma cutting system of claim 1, wherein said controller determines a pressure differential ratio between said first and second pressure locations and uses said pressure differential ratio to control said flow of said gas during the cutting operation.

8. The plasma cutting system of claim 1, further comprising a robotic arm connected to said cutting torch assembly, wherein said controller uses said first and second gas pressure detection devices to determine a gas flow model for said plasma cutting system based on at least one of a position and orientation of said cutting torch assembly established by the robotic arm,
   wherein said gas flow model models pressure changes within the plasma cutting system at a plurality of positions or orientations of said cutting torch assembly established by the robotic arm.

9. The plasma cutting system of claim 1, wherein said second gas pressure detection device detects a cavity pressure within a cavity of said torch assembly, and where said second gas pressure detection device is positioned remotely from said cavity and is coupled to said cavity with a gas pressure detection channel.

10. The plasma cutting system of claim 1, further comprising a gantry mechanism connected to said cutting torch assembly, wherein said controller uses said first and second gas pressure detection devices to determine a gas flow model for said plasma cutting system based on at least one of a position and orientation of said cutting torch assembly established by the gantry mechanism,
wherein said gas flow model models pressure changes within the plasma cutting system at a plurality of positions or orientations of said cutting torch assembly established by the gantry mechanism.

11. A plasma cutting system, comprising:
a gas flow control system having at shield gas flow valve which controls the flow of a shield gas through said gas flow control system, a plasma gas flow valve which controls the flow of a plasma gas through said gas flow control system, a first shield gas pressure detection device which detects a first location pressure of said shield gas downstream of said shield gas flow valve, and first plasma gas pressure detection device which detects a first location pressure of said plasma gas downstream of said plasma gas flow valve;
a cutting torch assembly coupled to said gas flow control system to receive each of said shield and plasma gas, where said cutting torch assembly comprises a second shield gas pressure detection device which detects a second location pressure of said shield gas downstream of said first shield gas pressure detection device, and a second plasma gas pressure detection device which detects a second location pressure of said plasma gas downstream of said first plasma gas pressure detection device;
a shield gas line located between the first shield gas pressure detection device and the second shield gas pressure detection device, wherein the shield gas is supplied to the cutting torch assembly from the gas flow control system through the shield gas line;
a plasma gas line located between the first plasma gas pressure detection device and the second plasma gas pressure detection device, wherein the plasma gas is supplied to the cutting torch assembly from the gas flow control system through the plasma gas line;
a power supply operatively connected to said cutting torch assembly to provide a cutting current amperage to the cutting torch assembly; and
a controller operatively coupled to each of said first and second shield and plasma gas pressure detection devices, to said shield and plasma gas flow valves, and to said power supply, where said controller controls an operation of said shield and plasma gas flow valves based on gas pressure feedback signals from each of said first and second shield and plasma gas pressure detection devices to provide a desired shield gas pressure level and a desired plasma gas pressure level within said cutting torch assembly,
wherein said desired plasma and shield gas pressure levels are determined by said controller based on at least one of a condition of said plasma cutting system and a parameter of a cutting operation,
wherein said controller dynamically changes said desired plasma and shield gas pressure levels during the cutting operation, based on, respectively, a detected plasma pas flow profile for said plasma cutting system determined by said controller using said first and second plasma gas pressure detection devices and a detected shield gas flow profile for said plasma cutting system determined by said controller using said first and second shield gas pressure detection devices, in timed coordination with changes to the cutting current amperage by said controller, and
wherein at least one of said detected plasma gas flow profile and said detected shield gas flow profile models pressure change time lags within the plasma cutting system.

12. The plasma cutting system of claim 11, wherein said second location pressures are a pressure of each of said shield and plasma gas flows as said shield and plasma gases enter said torch assembly, respectively.

13. The plasma cutting system of claim 11, wherein said second location pressure of said shield gas is in a shield cavity of said torch assembly and said second location pressure of said plasma gas is in a plasma chamber of said torch assembly.

14. The plasma cutting system of claim 11, wherein said controller detects a type of a consumable coupled to said torch assembly based on feedback from at least one grouping of said first and second shield gas pressure detection devices and first and second plasma gas pressure detection devices.

15. The plasma cutting system of claim 11, wherein when said controller is configured to detect a shield gas pressure differential between said first and second shield gas pressure locations that exceeds a predetermined threshold, and determine a leak or blockage of said shield gas line when said shield gas pressure differential exceeds the predetermined threshold.

16. The plasma cutting system of claim 11, wherein said controller determines a shield gas pressure differential ratio between said first and second shield gas pressure locations and a plasma gas pressure differential ratio between said first and second plasma gas pressure locations, and said controller uses said shield and plasma gas pressure differential ratios to control flows said shield and plasma gases during the cutting operation.

17. The plasma cutting system of claim 11, further comprising a robotic arm connected to said cutting torch assembly, wherein said controller uses said first and second shield and plasma gas pressure detection devices to determine a gas flow model for said plasma cutting system based on at least one of a position and orientation of said cutting torch assembly established by the robotic arm,
wherein said gas flow model models pressure changes within the plasma cutting system at a plurality of positions or orientations of said cutting torch assembly established by the robotic arm.

18. The plasma cutting system of claim 11, wherein said second shield gas pressure detection device detects a cavity pressure within a shield cavity of said torch assembly and is positioned remotely from said shield cavity and is coupled to said shield cavity with a shield gas pressure detection channel, and wherein said second plasma gas pressure detection device detects a cavity pressure of within a plasma gas cavity of said torch assembly and is positioned remotely from said plasma gas cavity and is coupled to said plasma gas cavity with a plasma gas pressure detection channel.

19. The plasma cutting system of claim 11, wherein when said controller is configured to detect a plasma gas pressure differential between said first and second plasma gas pressure locations that exceeds a predetermined threshold, and determine a leak or blockage of said plasma gas line when said plasma gas pressure differential exceeds the predetermined threshold.

20. The plasma cutting system of claim 11, further comprising a gantry mechanism connected to said cutting torch assembly, wherein said controller uses said first and second shield and plasma gas pressure detection devices to determine a gas flow model for said plasma cutting system based on at least one of a position and orientation of said cutting torch assembly established by the gantry mechanism,
  wherein said gas flow model models pressure changes within the plasma cutting system at a plurality of positions or orientations of said cutting torch assembly established by the gantry mechanism.

21. The plasma cutting system of claim 11, wherein said detected plasma gas flow profile and said detected shield gas flow profile for said system are determined by said controller during a calibration gas flow of said plasma cutting system, using said first and second shield and plasma gas pressure detection devices, prior to initiation of the cutting operation.

* * * * *